United States Patent [19]
Lai et al.

[11] Patent Number: 6,031,752
[45] Date of Patent: Feb. 29, 2000

[54] INSTALLATION FOR PROVIDING CONSTANT LOADING IN MEMORY SLOT

[75] Inventors: Jiin Lai; Ching-Fu Chuang, both of Taipei, Taiwan

[73] Assignee: VIA Technologies Inc., Taipei, Taiwan

[21] Appl. No.: 09/111,034

[22] Filed: Jul. 7, 1998

[30] Foreign Application Priority Data

Dec. 27, 1997 [TW] Taiwan ................................ 86119852

[51] Int. Cl.$^7$ .................................................. G11C 5/02
[52] U.S. Cl. ................................................ 365/52; 365/63
[58] Field of Search .............................. 365/52, 63, 174; 361/395

[56] References Cited

U.S. PATENT DOCUMENTS

| | | | |
|---|---|---|---|
| 5,016,223 | 5/1991 | Kimura et al. ............................ | 365/52 |
| 5,164,916 | 11/1992 | Wu et al. ................................. | 365/52 |
| 5,241,643 | 8/1993 | Durkin et al. ............................ | 365/52 |
| 5,572,457 | 11/1996 | Michael .................................... | 365/52 |
| 5,859,792 | 1/1999 | Rondeau, II et al. ..................... | 365/52 |

*Primary Examiner*—Son T. Dinh
*Attorney, Agent, or Firm*—Knobbe, Martens, Olson & Bear, LLP

[57] ABSTRACT

An installation inside a memory slot for providing a constant loading to an external signaling line with or without the insertion of a memory module into a memory slot. The installation operates by supplying a load element whose loading effect is roughly equivalent to the loading effect of a memory module when no memory module is plugged, and disconnecting the load element internally when a memory module is plugged into the memory slot. Hence, a constant loading is provided to the external signaling line no matter a memory module is plugged or not, and so signal quality and integrity of the signaling line can be maintained.

12 Claims, 3 Drawing Sheets

INSTALLATION FOR PROVIDING CONSTANT LOADING IN MEMORY SLOT

CROSS-REFERENCE TO RELATED APPLICATION

This application claims the priority benefit of Taiwan application Ser. No. 86119852, filed Dec. 27, 1997, the full disclosure of which is incorporated herein by reference.

BACKGROUND OF THE INVENTION

1. Field of Invention

The present invention relates to a memory slot installation. More particularly, the present invention relates to a memory slot installation that provides a constant loading for the signaling line of a computer main board despite putting in a variable amount of memory modules into the memory slots.

2. Description of Related Art

Most personal computers are assembled systems composing of a main board, interface cards and peripheral devices. The main board is the "heart" of the computer system. Besides having a central processing unit (CPU), a chip set and a series of slots for installing interface cards, the main board also has a plurality of memory slots for installing the required number memory modules depending on user's need. Each memory module can consist of one or more memory chips, which are connected together as a package. Because the number of memory modules installed in a particular main board is uncertain, designer of main boards and chip sets must consider the possibility of having a different number of memory modules installed so that its effects of loading variation on normal computer system functions are reduced to a minimum.

Since each memory module requires a driving current and a certain power rating, designers must keep in mind the driving capability of a signaling line when different number of memory modules are in use. In other words, the maximum current capable of being generated by the signaling line is an important consideration. Obviously, when only one memory module is installed, necessary driving current in the signaling line is very small. However, as more memory modules are installed, larger and larger driving current is needed. When all the memory slots are occupied by memory modules, the largest driving current is necessary.

Driving current for the memory modules in a main board is provided by the chip set. Therefore, the designer of computer chip sets must allow for situations where different combinations of memory modules are in used in the system, and then determine an appropriate driving capability. Having a driving capability too small or too large is going to affect the operation of the computer system adversely. For example, if the designed driving capability is small, whenever a greater number of memory modules are installed, there will be insufficient driving capability. This will lead to an additional timing delay in the rising edge and/or the falling edge of a signal, and thus the timing specification might be violated. However, if a larger driving capability is used in the design, and supposing there is only one memory module installed, the driving capability will then be too strong. A strong driving capability will lead to the overshooting of signal in its rising edge, undershooting of signal in its falling edge as well as causing a ringing effect. The occurrence of these phenomenal will distort the signal quality and leading to potential signal integrity issues in the main board, thereby results is the instability of the computer system itself.

When the clocking frequency in the computer system is low, the aforementioned signal distortion is going to be weak and can almost be ignored. However, as the system frequency used in the central processing unit and the main board is getting higher and higher, signal distortion problem caused by inappropriate driving capability will be intensified. Therefore, to determine the correct driving capability in the chip set has become a challenge for the designers.

Conventionally, to resolve the signal distortion problem due to inappropriate driving capability produced by a particular chip set design, two methods are used. In the first conventional method, the driving capability produced by a chip set is determined according to the power needed in a fully loaded situation. In other words, the chip set is designed to supply the power necessary for driving all the memory slots when all the memory modules are plugged. Then, a resistor having a fixed value is added to increase the loading; hence, decrease the driving capability. With this arrangement, if only a few memory modules are installed, in other words, a light load is used, the driving capability will be sufficiently depressed to avoid the overshooting or undershooting as well as the ringing effect of signals.

In the second conventional method, a buffer is also incorporated into the design of the chip set. The buffer is so designed that the driving capability is automatically adjusted by BIOS (Basic Input Output System) according to the size of the load being sensed. In other words, the chip set is able to lower the driving capability when a small number of memory modules are installed, and also able to raise the driving capability when a large number of memory modules are installed. However, due to design complication, usually a buffer with only two levels of driving capability is implemented. That means, either a level having a low driving capability is used. Or else, a level having a higher driving capability is used.

Although the above two methods are capable of reducing distortion of signals due to a variation of driving capability demanded, they have defects.

The first method of providing sufficiently large driving capability to drive a full load and then lowering the driving capability back to a lower level with the addition of a fixed resistance resistor is able to lessen the driving capability when a light load is used. However, this method of design seems to be self-contradictory. Moreover, the driving capability produced by this method is imprecise.

In the second method, a buffer is used to adjust the driving capability according to the load condition. However, the buffer will increase the complexity of chip set design and bring production costs up. Therefore, in general, only two levels of driving capability can be provided, which is still a long way from providing full load matching necessary for obtaining the optimum results.

When the clock frequency used in a computer is low, each clock cycle for a clocked signal is long. Therefore, the effect of a poor signal quality or signal distortion is only mild, and two levels of driving capability may be sufficient to solve the problem. However, with the ever-increasing clocking frequency, each clock cycle in a clocked system becomes shorter, and hence the tolerance for distorted signals becomes smaller. The two rough-and-ready methods mentioned above will be insufficient to improve the quality of signals.

In light of the foregoing, there is a need to provide an improved memory slot design so that the driving current supplied by the chip set will directly reflect the actual memory loading condition in the memory slots.

SUMMARY OF THE INVENTION

Accordingly, the present invention is to provide an installation inside each memory slot that can create a constant loading for the chip set despite using a variable number of memory modules. Consequently, the problem of inappropriate driving capability that can lead to a distortion of signal is solved, and the quality of signals running in the computer main board is improved.

In another aspect, this invention is able to provide a constant loading for the signal line so that the driving capability matches the existing loading without the need for adding complex circuitry. Hence, besides reducing circuit design complexity, this invention is also able to save production cost.

To achieve these and other advantages and in accordance with the purpose of the invention, as embodied and broadly described herein, the invention provides a memory slot installation for maintaining a constant loading for a signal line. The memory slot installation is installed within a memory slot and there are a number of memory slots for plugging memory modules in the main board. At least one signaling line and an earth wire are coupled to the installation inside the memory slot. The installation inside the memory slot comprises a load element and a changeover switch. The changeover switch includes memory module contact point, a load element contact point and a signaling line contact point. The changeover switch is capable of connecting the signaling line contact point to the load element contact point, or alternatively, connecting the signaling line contact point to the memory module contact point. One end of the load element is coupled to the earth wire of the main board, while the other end is coupled the load element contact point of the changeover switch. The load element acts as an equivalent loading for the memory module, and can be a resistor, a capacitor, a number of resistors in series, a number of resistors in parallel, a number of capacitors in series, a number of capacitors in parallel or number of capacitors and resistors in series or in parallel. The changeover switch further includes a metallic spring piece and a fixed metallic contact point. The metallic spring piece is coupled to the signaling contact point, and the fixed metallic contact point is coupled to the load element contact point. When no memory module is inserted, the metallic spring piece is in contact with the fixed metallic contact point, and the signaling line of the main board is connected to the load element. However, when a memory module is inserted into the memory slot, the metallic spring piece is forced to separate from the metallic contact point. The metallic spring piece is connected to the memory module contact point, and the signaling line contact point is now connected to the memory module contact point. Hence, the signaling line of the main board is coupled to the memory module through the changeover switch.

The aforementioned installation inside the memory slot for providing a constant load is also operational with just the changeover switch. The load element can reside elsewhere on the main board instead and then coupled by a wire to the load element contact point of the changeover switch. When no memory module is inserted, the signaling line is coupled to the load element through the changeover switch. On the other hand, when a memory module is inserted, the signaling line is coupled to the memory module through the changeover switch.

As mentioned above, the load element can be installed inside the memory slot or installed elsewhere above the main board. Their mode of action includes the following steps: when a memory slot is vacant, the metallic spring piece and the fixed metallic contact point are in contact with each other, signaling line of the main board is then coupled to the load element through the changeover switch; when a memory module is inserted into the memory slot, the metallic spring piece and the fixed metallic contact point will separate, the metallic spring piece of the changeover switch will now make contact with the memory module contact point, and the signaling line of the main board is now coupled to the memory module through the changeover switch.

Using the above installation method, when a memory slot is vacant, signaling line of the main board will be connected to the load element. Alternatively, when a memory module is inserted into the memory slot, signaling line of the main board will be connected to the memory module. Hence, no matter whether a memory module is inserted into a memory or not, loading of the signaling line will remain constant as long as appropriate load element is selected. Therefore, the quality of signal running in the main board will be unaffected by memory module insertion.

The basic design of this invention actually comprises a memory slot that is capable of holding a memory module. The memory slot has connection pins inside with one end of the connection pins soldered onto a printed circuit board while the other end is attached to a metallic spring piece. Whenever a memory module is inserted into the memory slot, the metallic spring piece is able to provide a tight contact with a contact finger in the memory module. Consequently, signals coming from the main board are able to pass from the signaling line through the soldered connection pins, the metallic spring piece and the contact finger to the individual element in the memory module. Underneath the metallic spring piece, there is a fixed metallic contact point. The other end of the fixed metallic contact point is connected to a load element, which is used as a constant load. The other end of the load element is connected to an earth wire. The load element is specially selected to have a resistance as close to the equivalent resistance of the memory module as possible. The load element can be a resistor, a capacitor, or other equivalent load elements. When the memory slot is vacant, the metallic spring piece will make contact with the fixed metallic contact point, and so the load element will become a loading for the signaling line. However, when a memory module is inserted into the memory slot, the metallic spring piece will be forced to shift sideward by the memory module, thereby separating the metallic spring piece from the fixed metallic contact point. Hence, connection between the fixed metallic contact point and the signaling line is cut off, and so the memory module now becomes a loading for the signaling line. Therefore, no matter whether a memory module is inserted into a memory slot or not, a constant loading is put on the signaling line. Consequently, signal quality will not vary with the actual amount of memory modules installed on the main board of a computer, and so an improvement in the quality of signals is achieved.

It is to be understood that both the foregoing general description and the following, detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
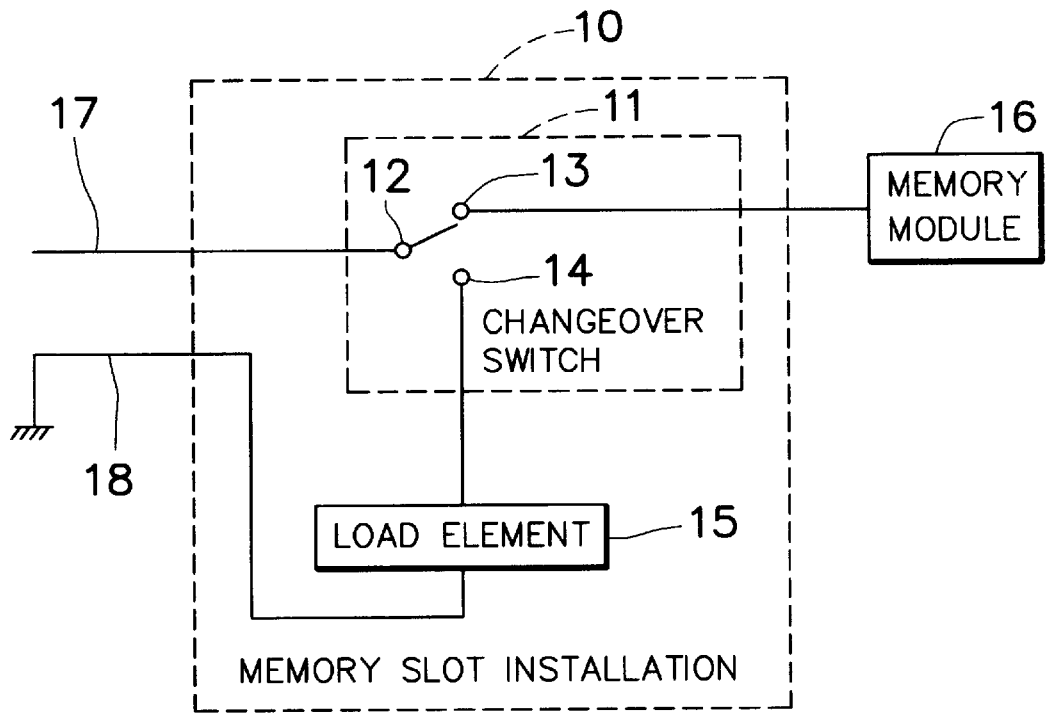
FIGS. 1a and 1b are simplified block diagrams showing the mode of operation according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
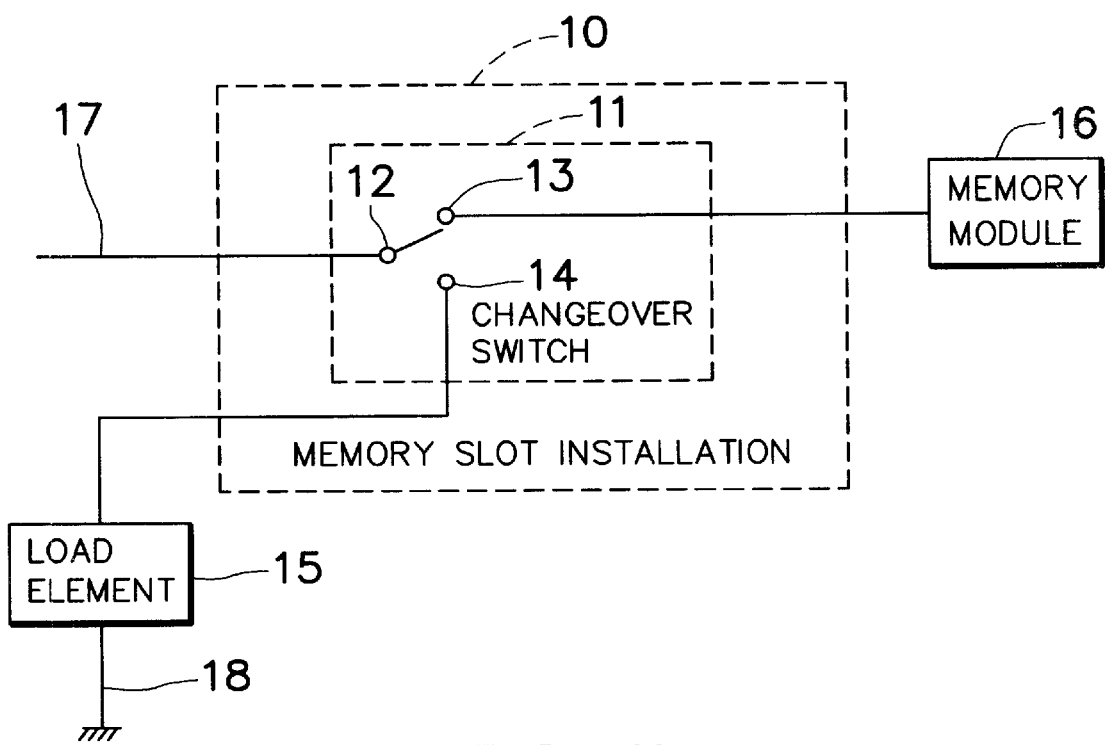

FIGS. 1a and b are simplified block diagrams showing the mode of operation according to one preferred embodiment of this invention. As shown in FIGS. 1a and 1b, a signaling line 17 of the main board is coupled to a signaling line contact point 12 of a changeover switch 11. A memory module contact point 13 in the changeover switch 11 is coupled to the memory module. A load contact point 14 is coupled to one end of a load element 15, while the other end of the load element 15 is coupled to an earth wire 18 of the main board. FIG. 1a and FIG. 1b are slightly different in the layout of their load element 15. In FIG. 1a, the load element 15 is enclosed within a memory slot. In FIG. 1b, the load element 15 is installed elsewhere on the main board in FIG. 1b, and hence needs to be connected by a piece of connecting wire to the changeover switch 11. The load element 15 is specially selected to match as close as possible the impedance of the memory module. The load element 15 acts as a substitute loading for the signaling line when no memory module 16 is inserted. When the memory slot is vacant, the signaling line contact point 12 of the changeover switch is connected to the load element contact point 14. Hence, signaling line 17 is coupled to the load element 15 and the load element 15 becomes the loading for signaling line 17. After the memory module 16 is inserted into the memory slot, the signaling line contact point 12 of the changeover switch is connected to the memory module contact point 13. Hence, signaling line is now coupled to the memory module 16, and the memory module 16 becomes the loading for the signaling line 17.

Figure 2A:
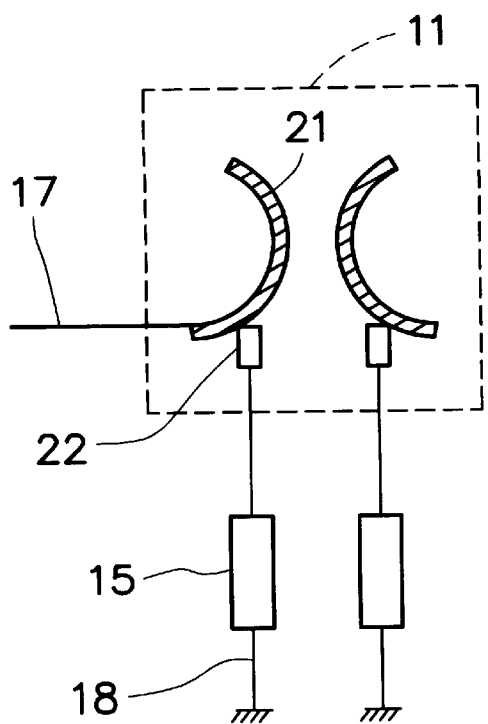
FIGS. 2a and 2b show a changeover switch 11 in action according to the embodiments of this invention as shown in FIGS. 1a and 1b.
Figure 2B:
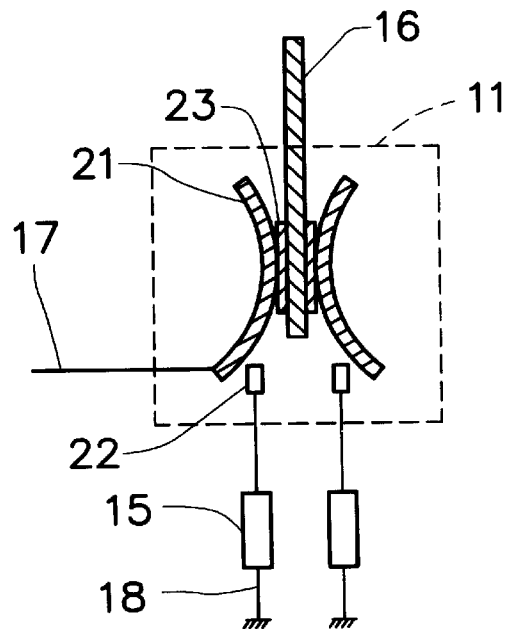

The changeover switch 11 is enclosed within the memory slot. Besides having a mounting mechanism for fixing the memory module, the memory slot further includes a metallic spring piece 21 capable of providing good electrical contact with the contact fingers on the memory module 16. Therefore, the signaling line is coupled to the memory module. The changeover switch 11 utilizes the spring tension in the metallic spring piece 21 to accomplish the switch over function. FIGS. 2a and 2b show a changeover switch 11 in action according to the embodiments of this invention as shown in FIGS. 1a and 1b. As shown in FIG. 2a and FIG. 2b, the original function of the metallic spring piece 11 is to act as a contact point for connecting with the contact finger on the memory module so that signals coming from the signaling line 17 can pass to the memory elements inside the memory module 16. However, in this invention, there is a fixed metallic contact point 22 underneath the metallic spring piece 21. The fixed metallic contact point 22 is connected to one terminal of the load element 15, while the other terminal of the load element 15 is connected to an earth wire 18 of the main board. With this arrangement, when no memory module is inserted, the metallic spring piece 21 will make contact with the fixed metallic contact point 22 forming a connection that couples the signaling line 17 to the load element 15. After memory module 16 is plugged into the memory slot, the metallic spring, piece 21 is in contact with the memory module contact point 23. In the meantime, the metallic spring piece 21 will be forced away from the fixed metallic contact point 22 by the memory circuit board, thus cutting off their connection. Hence, the load element 15 is separated from the signaling line 17, and now signals can pass from the signaling line 17 through the metallic spring piece 21 and the memory module contact point 23 to the memory module 16. When the memory module 16 is unplugged from the memory slot, the metallic spring piece 21 will return to its original shape, and so reconnecting itself with the fixed metallic contact point 22. Consequently, the load element 15 is coupled to the signaling line 17 and the load element 15 now serves as a loading for the signaling line 17 again.

Figure 3:
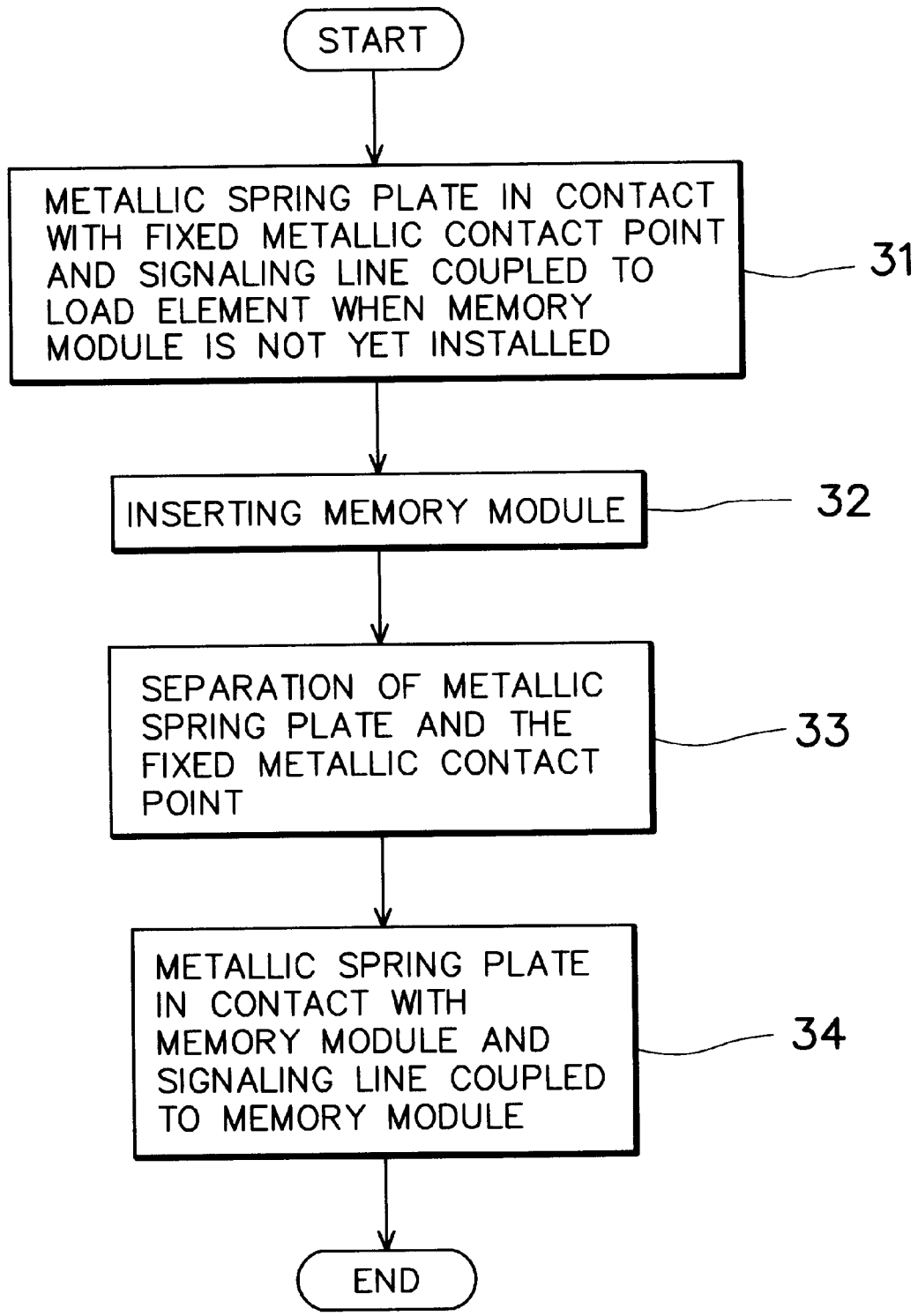
FIG. 3 is a block diagram showing the state of action for engaging the installation of this invention.

FIG. 3 is a block diagram showing the state of action for engaging the installation of this invention. With reference also to FIGS. 1a, 1b, 2a and 2b, step 31 refers to the state when the memory slot is still vacant. Under this state, the metallic spring piece 21 of the changeover switch 11 is in contact with the fixed metallic contact point 22. In other words, the signaling line contact point 12 is connected to the load element contact point 14 so that the signaling line 17 is coupled to the load element 15. In step 32, a memory module 16 is plugged into the memory slot. Next, in step 33, the metallic spring piece 21 is pushed aside a little by the insertion of the memory module 16, and so separating from the fixed metallic contact point 22. Finally, in step 34, the metallic spring piece 21 of the changeover switch makes contact with the memory module contact point 23, and so the signaling line 17 is coupled to the memory module 16.

According to the above method of installation, when no memory module is plugged into the memory slot, signaling line of the main board will couple to the load element. After memory module is inserted into the memory slot, the signaling line will couple to the memory module instead. This arrangement produces a constant loading for the signaling line no matter whether memory module is inserted or not. Hence, signal quality will be unaffected by how many modules are installed into the memory slots.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory slot installation installed on a computer main board for providing a constant loading, which is coupled to memory slot suitable for plugging a memory module, and wherein there are at least a signaling line and an earth wire coming from the main board coupled to the installation, the installation comprises:

a load element with one end coupled to the earth wire acting as an equivalent impedance; and a changeover switch allowing the signaling line to couple to the load element when no memory module is installed and allowing the signaling line to couple to the memory module when a memory module is inserted into the memory slot.

2. The installation of claim 1, wherein the changeover switch further includes:

a load element contact point coupled to the load element;

a signaling line contact point coupled to the signaling line; and a memory module contact point coupled to the memory module when the memory module is inserted into the memory slot;

wherein the changeover switch is coupled the signaling line contact point to either the load element contact point or the memory module contact point, when no memory module is plugged, the signaling line contact point is connected to the load element contact point, and when a memory module is plugged, the memory module contact point is connected to the signaling line contact point.

3. The installation of claim 2, wherein the changeover switch further includes:

a fixed metallic contact point with one end coupled to the load element contact point; and a metallic spring piece with one end connected to the signaling line contact point, so that when no memory module is plugged, the metallic spring piece is in contact with the fixed metallic contact point, and when memory module is plugged into the memory slot, the metallic spring piece is in contact with the memory module, and at the same time, the metallic spring piece separates from the fixed metallic contact point.

4. The installation of claim 1, wherein the load element includes a resistor.

5. The installation of claim 1, wherein the load element includes a capacitor.

6. The installation of claim 1, wherein the load element includes a capacitor and a resistor.

7. The installation of claim 6, wherein the load element includes a capacitor in series with a resistor.

8. The installation of claim 6, wherein the load element includes a capacitor in parallel with a resistor.

9. A memory slot installation on a computer main board for providing a constant loading, which is inside a memory slot suitable for plugging a memory module, and that there are at least a signaling line and a load element coming from the main board coupled to the installation inside the memory slot, the installation inside the memory slot comprises:

a load element contact point coupled to the loading element;

a signaling line contact point coupled to the signaling line; and a memory module contact point coupled to the memory module when a memory module is plugged into the memory slot;

wherein the installation inside the memory slot coupled the signaling line contact point to either the load element contact point or the memory module contact point, when no memory module is plugged, the signaling line contact point is connected to the load element contact point, and when a memory module is plugged, the memory module contact point is connected to the signaling line contact point.

10. The installation of claim 9, wherein the installation further includes:

a fixed metallic contact point with one end coupled to the load element contact point; and a metallic spring piece with one end being the signaling line contact point, so that when no memory module is plugged, the metallic spring piece is in contact with the fixed metallic contact point, and when memory module is plugged into the memory slot, the metallic spring piece is in contact with the memory module, and at the same time, the metallic spring piece separates from the fixed metallic contact point.

11. A memory slot installation on a computer main board for providing a constant loading, which is inside a memory slot suitable for plugging a memory module, and that there is at least a signaling line coming from the main board coupled to the installation inside the memory slot, the installation inside the memory slot comprises a load element and a changeover switch, the changeover switch further includes a metallic spring piece and a fixed metallic contact point, wherein the fixed metallic contact point is coupled to the load element, and the metallic spring piece is coupled to the signaling line, and their mode of action comprises the steps of:

when no memory module is plugged into a memory slot, the metallic spring piece is in contact with the fixed metallic contact point, and the signaling line is coupled to the load element through the changeover switch;

memory module is plugged into the memory slot;

the metallic spring piece and the fixed metallic contact point separates; and the metallic spring piece is in contact with the memory module, and the signaling line is coupled to the memory module through the changeover switch.

12. A memory slot installation on a computer main board for providing a constant loading, which is inside a memory slot suitable for plugging a memory module, and that there are at least a signaling line and a load element coming from the main board coupled to the installation inside the memory slot, the installation inside the memory slot further includes a metallic spring piece and a fixed metallic contact point, wherein the fixed metallic contact point is coupled to the load element, and the metallic spring piece is coupled to the signaling line, and their mode of action comprises the steps of:

when no memory module is plugged into a memory slot, the metallic spring piece is in contact with the fixed metallic contact point, and the signaling line is coupled to the load element;

memory module is plugged into the memory slot;

the metallic spring piece and the fixed metallic contact point separates; and the metallic spring piece is in contact with the memory module, and the signaling line is coupled to the memory module.

* * * * *